United States Patent
Rodriguez Soler et al.

(10) Patent No.: US 10,211,464 B2
(45) Date of Patent: Feb. 19, 2019

(54) ELECTROCHEMICAL CELL ALUMINUM-MANGANESE

(71) Applicant: Albufera Energy Storage, S.L., Madrid Madrid (ES)

(72) Inventors: Paloma Rodriguez Soler, Madrid (ES); Joaquin Jose Chacon Guadalix, Madrid (ES); Enrique Fatas Lahoz, Madrid (ES); Pilar Ocon Esteban, Madrid (ES); Mikel Pino Martinez, Madrid (ES)

(73) Assignee: Albufera Energy Storage, S.L., Madrid (ES)

(*) Notice: Subject to any disclaimer, the term of this patent is extended or adjusted under 35 U.S.C. 154(b) by 0 days.

(21) Appl. No.: 15/138,800

(22) Filed: Apr. 26, 2016

(65) Prior Publication Data

US 2017/0005343 A1    Jan. 5, 2017

(30) Foreign Application Priority Data

Apr. 29, 2015 (ES) .................................. 201530580

(51) Int. Cl.
*H01M 4/46* (2006.01)
*H01M 4/50* (2010.01)
(Continued)

(52) U.S. Cl.
CPC .......... *H01M 6/045* (2013.01); *B64C 39/024* (2013.01); *H01M 4/06* (2013.01); *H01M 4/463* (2013.01);
(Continued)

(58) Field of Classification Search
CPC ........ H01M 6/045; H01M 6/02; H01M 4/622; H01M 4/463; H01M 4/50; H01M 4/625;
(Continued)

(56) References Cited

U.S. PATENT DOCUMENTS 2,554,447 A    5/1951    Sargent
2,838,591 A    6/1958    Stokes, Jr.
(Continued)

FOREIGN PATENT DOCUMENTS

GB    720953    12/1954
GB    2493494 A    2/2013
(Continued)

OTHER PUBLICATIONS

Li et al, "Aluminum as Anode for Energy Storage and Conversion: a review", Elsevier, Journal of Power Sources 110 (2002), pp. 1-10.
Ma et al, "Performance of Al—0.5 Mg—0.02 Ga—Sn—0.5 Mn as anode for Al-air battery in NaCl solutions", Journal of Power Sources, 2014, vol. 253, pp. 419-123.

*Primary Examiner* — Stewart A Fraser
(74) *Attorney, Agent, or Firm* — Reches Patents

(57) ABSTRACT

The present invention relates to an electrochemical cell characterized in that it comprises at least a positive electrode which comprises manganese physically separated from at least a negative electrode which comprises an aluminum alloy, and wherein said positive and negative electrodes are electrically connected through a neutral pH electrolyte. Further, the present invention relates to the use of the electrochemical cell, preferably as a button battery in hearing aids.

18 Claims, 1 Drawing Sheet

(51) Int. Cl.
*H01M 6/04* (2006.01)
*H01M 4/06* (2006.01)
*H01M 4/62* (2006.01)
*B64C 39/02* (2006.01)
*H01M 6/02* (2006.01)
H01M 4/36 (2006.01)
H01M 4/02 (2006.01)

(52) U.S. Cl.
CPC ............. *H01M 4/50* (2013.01); *H01M 4/622* (2013.01); *H01M 4/625* (2013.01); *H01M 6/02* (2013.01); *B64C 2201/022* (2013.01); *B64C 2201/042* (2013.01); *B64C 2201/101* (2013.01); *B64C 2201/125* (2013.01); *B64C 2201/141* (2013.01); *B64C 2201/165* (2013.01); *H01M 4/366* (2013.01); *H01M 2004/027* (2013.01); *H01M 2004/028* (2013.01); *H01M 2220/30* (2013.01); *H01M 2300/0002* (2013.01)

(58) Field of Classification Search
CPC ..... H01M 2004/027; H01M 2004/028; H01M 2300/0002; H01M 2220/30
See application file for complete search history.

(56) References Cited

U.S. PATENT DOCUMENTS

| | | | |
|---|---|---|---|
| 3,883,368 A * | 5/1975 | Kordesch | H01M 16/00 429/9 |
| 2002/0068222 A1 | 6/2002 | Ishii et al. | |
| 2009/0053594 A1 | 2/2009 | Johnson et al. | |
| 2009/0325070 A1 | 12/2009 | Soloveichik et al. | |
| 2010/0285375 A1 | 11/2010 | Friesen et al. | |
| 2011/0039148 A1 | 2/2011 | Wang et al. | |
| 2012/0082904 A1 | 4/2012 | Brown et al. | |
| 2012/0082905 A1 * | 4/2012 | Brown | H01M 4/463 429/338 |
| 2013/0164611 A1 * | 6/2013 | Nanba | H01M 4/134 429/211 |
| 2015/0093659 A1 | 4/2015 | Gonzalez et al. | |
| 2015/0140400 A1 * | 5/2015 | Yamazaki | H01M 10/0585 429/136 |

FOREIGN PATENT DOCUMENTS

| | | |
|---|---|---|
| WO | 2004082060 A1 | 9/2004 |
| WO | 2011061728 A1 | 5/2011 |

* cited by examiner

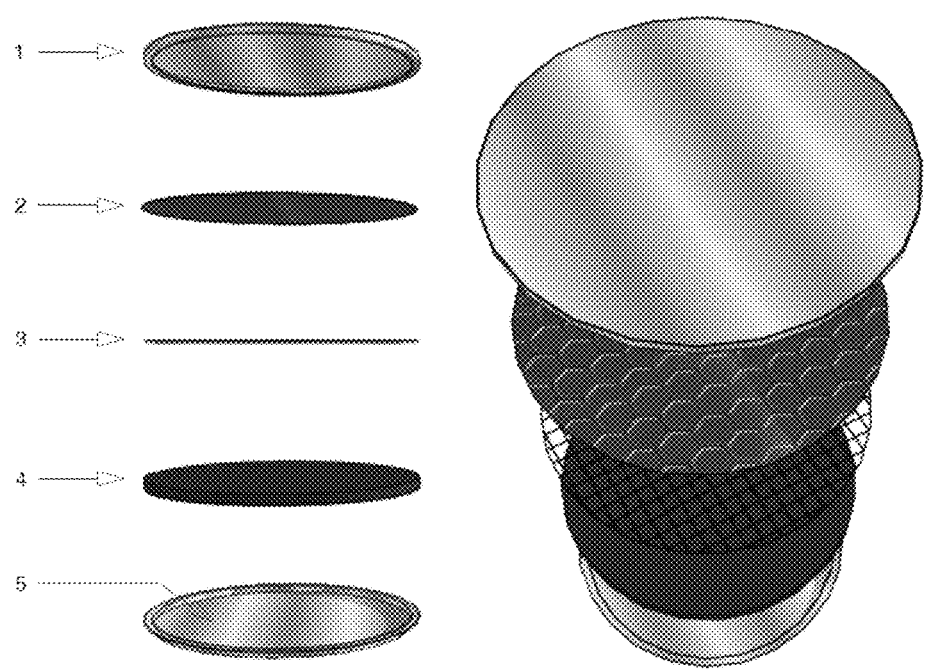

ELECTROCHEMICAL CELL ALUMINUM-MANGANESE

TECHNICAL FIELD

The present invention relates to the field of the storage and supply of electrical energy. More specifically, it relates to a new device or electrochemical cell based on aluminium and manganese.

BACKGROUND OF THE INVENTION

Energy storage is a factor intimately linked with the development of electrical systems within the framework of current and future cities. In this progressive society the concept of a Smart City is becoming firmly established as one of the fundamental elements in innovative city design and is a priority within the EU's Horizon 2020. The development of these new cities, where a vast number of devices and sensors gather and exchange signals from a range of sources, creates a requirement within the electrical storage and supply sector. As a result there is a need to develop intelligent networks capable of improving energy storage, with the aim of achieving greater flexibility and stability in the network and thus facilitating the quality and management of electrical supply.

Due to the high number of devices and sensors and the diverse location of these within cities, mains power supply can often be difficult or costly to install. As a result, primary or rechargeable batteries are frequently used to supply these devices. The high cost of the rechargeable batteries and the inconvenience of recharging favours the choice of primary batteries where the only maintenance required is their replacement when they run down. In this regard the low consumption of the devices and sensors permits a high degree of independence, in such a way that their replacement may be extended over long periods of time. The primary electrochemical accumulators currently on sale such as alkaline, zinc-air or primary lithium batteries etc. possess certain limitations in terms of energy requirements, weight/volume or price. As a result there is a need to develop batteries with improved specific energy capacities which would allow less frequent maintenance of the devices and improvement in terms of weight and volume requirements.

Within this investigative framework, metal-air batteries have demonstrated the potential for storing more energy than lithium-ion batteries, currently used in electrical vehicles and various applications on the electrical mains network. In a metal-air battery, the metal (such as zinc. aluminium. lithium, etc.), reacts with the oxygen in the air to generate electricity.

Depending on the materials used, metal-air batteries may also be less expensive than lead-acid batteries, which are currently the cheapest rechargeable batteries most frequently used in photovoltaic and automobile power applications.

Although non-rechargeable metal-air batteries have been used commercially for a long time (frequently used in hearing aids for example), they present the problem of being difficult to recharge electrically. In this regard, to repeatedly recharge a metal-air battery it is necessary to extract the oxygen and reform the metal element again. However, the structures the metal tends to form as a result present certain problems which make the reversibility of the oxidation-reduction reactions of the process difficult.

On the other hand, creating a long lasting air electrode (the point of interaction between the battery and the exterior) is also difficult. Existing examples work well for single use batteries, but not for rechargeable batteries intended for longer life.

In all events, the charging of an aqueous electrolyte is impossible for various reasons, making it necessary to replace the electrolytes with organic compounds or ionic liquids.

Nevertheless, there are numerous inventions related to this technology, based on lithium-air batteries, which have been shown to have four times more energy than the traditional lithium-ion, zinc-air or the recent aluminium-air.

In this way, for example, in WO2004082060 a high capacity air battery is described which comprises a structure for the storage of air designed to retain and transfer oxygen as the active material of the positive electrode and an electrolyte capable of absorbing the dampness in the air which comprises at least aluminium chloride and calcium chloride. As the active material of the negative electrode either aluminium or an aluminium alloy is used.

In US2010285375 a metal-air electrochemical cell is described in which a low temperature ionic liquid is used as the electrolyte.

In US2009053594 an air battery is described which comprises an air cathode with a porous carbon structure and which contains a non-aqueous organic solution electrolyte which comprises a lithium and alkylenecarbonate salt as an additive.

In WO2011061728 air batteries are described which comprise silicon as an anode and air as a cathode to separate the oxygen and a non-aqueous electrolyte.

Finally, in US2015093659 an electrochemical cell is described capable of generating and/or accumulating electrical energy which comprises an aluminium or aluminium alloy electrode and a non-aqueous electrolyte which contains a mixture of $AlCl_3$ and a chlorinated cycle or heterocycle of an aliphatic nitrogen derivative.

Within these technologies, the present invention is included among aluminum-air batteries, with aluminium being a very attractive material in the field of energy storage. This is due to the fact that aluminium is a very accessible metal which, when compared with other systems from the same family, also presents a high gravimetric energy density (close to 3 Ah/g) comparable to that of lithium (3.86 Ah/g). Furthermore its volumetric energy density (8.04 $Ah/cm^3$) is four times higher than that of lithium and it provides a voltage per cell similar to alkaline batteries using nickel electrodes.

Nevertheless one of the disadvantages of this technology, and the reason it is not currently commercially successful, is the self-corrosion of aluminium in alkaline electrolytes. As a product of this corrosion active material (Al) is lost and hydrogen is given off in a spontaneous manner. This results in an uncontrolled loss of energy, and a corresponding reduction in the active life of the battery subject to this corrosion.

The object of this invention is therefore to present a solution which inhibits the corrosion of batteries and electrochemical cells without sacrificing the other parameters of these such as the electric potential difference or the high specific energy.

DESCRIPTION OF THE INVENTION

In this way, a first object of the invention is to provide an electrochemical cell characterized in that it comprises a positive electrode comprising manganese as a positive electrode material physically separated, via a physical separator (which preferably consists of a sheet composed of at least one plastic polymer material capable of supporting the internal saline environment of the cell), from a negative electrode which comprises an aluminium alloy as the negative electrode material; and where the said positive and negative electrodes are electrically connected by an neutral pH electrolyte ion conductor between both polarities (positive and negative). In this manner the electrolyte, on bathing both electrodes, permits the passage of ions so that the electrochemical reaction may take place.

In a preferred embodiment, the electrochemical cell is also surrounded by a casing which houses all of the components of the cell in its interior. This casing is constituted of elements or pieces, preferably metallic and/or plastic, which serve to provide the sufficient mechanical robustness of the unit as a whole, the electrical connectivity with the external loads (positive and negative poles) and the corresponding joins between the various cell components ensuring a correct closure of the system and a safety mechanism against excess internal pressure in the event of short circuits or uncontrolled manipulation.

For the purposes of this patent an electrochemical cell is understood to mean an energy storage device, battery or primary battery, manufactured with materials which during the discharge of the device when connected to an external load produce a stable and controlled electrical current until the exhaustion of the initial chemical forms. The format of the electrochemical cell the object of this invention is not restricted, and it may take various different physical formats amongst which is worth mentioning, for example button batteries, cylindrical batteries or prismatic batteries.

The positive pole of the battery is connected internally with the positive electrode which is preferably composed of a substrate in the form of a sheet or mesh, preferably of steel, which provides mechanical consistency and electronic conductivity to the electrode. Likewise, the said positive electrode is preferably covered with a mixture of manganese oxide, which may be of a perovskite or spinel type, among others, in a preferred percentage of between 20 and 80% in weight of the mixture, a carbonaceous material preferably of a graphite type or made from nanomaterials of tube, fibre or graphene types in a preferred percentage of between 20 and 80% weight of the mixture and at least one binding agent additive of a polyvinylidene fluoride (PVDF), carboxymethyl cellulose (CMC) or acacia gum type, among others, to encourage the plastic properties of the mixture for handling during the manufacturing process, in a preferred percentage of between 1 and 20% of the weight of the mixture.

In turn, the negative pole of the battery is connected internally to the negative electrode which is preferably composed of a substrate of an aluminium alloy in the form of a sheet or ordered or unordered microfibers. The composition of the alloy will be variable according to the power or energy requirements of the electrochemical cell. In a preferred embodiment it will comprise a metal as the alloying element, preferably selected from either magnesium, zinc, tin or gallium, among others, each of these in proportions preferably inferior to 5% in weight. Two specific purposes may be distinguished in the action of these alloys: the first being to increase the oxidation potential of the cell, for which, for example, the Mg and Ga will be used; and a second purpose which is to inhibit the release of hydrogen due to the self corrosion of the aluminium, for which, for example, Zn and Sn will be used. As a result the reaction in the anode will be the oxidation of the Aluminium: $Al \rightarrow Al^{3+} + 3e^-$.

In a preferred embodiment, the negative electrode will be covered with either a high porosity graphene surface, carbon nanotubes or other carbonaceous compounds with porous structures which promote the reactivity of the aluminium surface via a surface cleaning mechanism of the compounds produced during the discharge of the battery.

The positive and negative electrodes of the battery may be of a number, size and weight sufficient to guarantee the capacity or electrical charge necessary for the electrochemical storage cell.

In terms of the connection electrolyte between the two electrodes, in a preferred embodiment this will be composed of an aqueous solution of at least one sodium chloride salt (preferably in a variable concentration of between 0.5 and 4 M, depending on the application for which the electrochemical cell is designed) which in turn may comprise other additives such as, for example, zinc oxide, sodium fluoride or sodium citrate. These additives may consist of additives suited to promoting the efficiency of the cell discharge, activating the surface of the aluminium electrode, preventing the creation of hydrogen and/or increasing the durability or lifespan of the cell components. In a preferred embodiment they may consist of zinc oxide, sodium fluoride or sodium citrate in concentrations of each inferior to 5% in weight of the solution. This electrolyte presents a neutral pH and has conductivity sufficient for the applications that use this type of device.

This new electrochemical cell, the object of the invention, offers the advantage of being able to generate greater energy capacity, generally producing an 100% increase in energy quantity per volume and 200% increase in energy quantity per weight of the device. In general, it will be able to supply energy for a range of different devices and sensors, with a design (weight/volume) which can be modified within a broad spectrum according to specific requirements. In this way the claimed electrochemical cell may be used both in applications requiring a high degree of independence and those needing increased power or reduced discharge time. Its most direct applications, for example, would include the use as a button type battery. These button type batteries consist of accumulators of low volume and weight and are designed for applications with low electrical power requirements and limited space. In this way, the batteries the object of the present invention may compete directly with those currently on the market based on Zinc-air (used for example in hearing aids and with an independent life of 4-5 days) and would offer improved performance levels (in general it is possible to increase independent life up to more than a week's duration).

In addition, the claimed electrochemical cells may be used as smart components within the network, in power plants using renewable energy sources.

BRIEF DESCRIPTION OF FIG. 1

FIG. 1 shows a diagram of a particular embodiment of the electrochemical cell the object of this invention representing the following elements:

(1) The metallic casing, which covers and encapsulates all of the elements of the battery:

(2) An aluminium anode with an upper protective layer of graphene or other carbonaceous material;

(3) Physical separator (membrane):

(4) Cathode composed of a mixture of manganese oxide and carbonaceous material; and (5) A metallic mesh which acts as a current collector, and on which the cathode is supported.

Likewise, the battery comprises a neutral electrolyte located in the interior of the cell, which floods all the elements thereof.

DESCRIPTION OF AN EMBODIMENT OF THE INVENTION

FIG. 1 shows a particular embodiment of the invention which corresponds to an aluminium-manganese primary battery (not electrically rechargeable) suited for use in hearing aids. This application refers to a button type battery. This means that the outside casing, preferably metallic, is of a flat and circular shape.

In the manufacturing process of the battery, the constituent elements thereof (as defined within the "Brief description of FIG. 1") are first cut in the form of very thin discs with a maximum diameter of 10 mm and a thickness of between 0.2-0.5 mm. These are then arranged consecutively as seen in the FIGURE, in the form of a sandwich, and flooded with the electrolyte.

Finally the casing is closed and pressed shut.

Once the battery is assembled, with about 1.5 V of voltage, it will work for approximately 7 days, in contrast to those currently available which last a maximum of 4-5 days, with a continuous discharge of current of C120.

The invention claimed is:

1. A non-rechargeable primary electrochemical cell comprising a positive electrode comprising manganese as a positive electrode material physically separated, by a membrane, from a negative electrode which comprises an aluminum alloy as a negative electrode material; wherein the negative electrode is covered with a carbonaeous material surface with porous structures which promote the reactivity of a surface of the aluminum alloy via a surface cleaning mechanism of the compounds produced during the discharge of the electrochemical cell; and wherein said positive and negative electrodes are electrically connected by a neutral pH electrolyte.

2. The cell according to claim 1, wherein the positive electrode comprises a mixture of manganese oxide, a carbonaceous material and at least one binding agent additive.

3. The cell according to claim 2, wherein the percentage of manganese oxide in the mixture is between 20 and 80% in weight.

4. The cell according to claim 2, wherein the percentage of carbonaceous material in the mixture is between 20 and 80% in weight.

5. The cell according to claim 2, wherein the percentage of the binding agent additive in the mixture is between 1 and 20% in weight.

6. The cell according to 1, wherein the aluminum alloy comprises at least one metal as an alloying element selected from a group consisting of magnesium, zinc, tin and gallium.

7. The cell according to claim 6, wherein the metal as an alloying element is present in a proportion lower than 5% in weight.

8. The cell according to claim 1, wherein the carbonaceous material is graphene.

9. The cell according to claim 1, wherein the electrolyte consists of an aqueous solution of at least one sodium chloride salt.

10. The cell according to claim 9, wherein the aqueous solution comprises at least one additional additive selected from zinc oxide, sodium fluoride and sodium citrate.

11. A button battery in hearing aids comprising an electrochemical cell according to claim 1.

12. The cell according to claim 1 wherein the membrane, the positive electrode and the negative electrode are circular.

13. The cell according to claim 1 wherein the negative electrode comprises an aluminum alloy in a form of a sheet of unordered microfibers.

14. The cell according to claim 1 comprising a casing that covers and encapsulates the positive electrode, the membrane, the negative electrode, and the neutral pH electrolyte.

15. The cell according to claim 14, consisting of the positive electrode, the membrane, the negative electrode, the neutral pH electrolyte and the casing.

16. The cell according to claim 14, wherein a top of the casing is parallel to (a) a bottom of the casing, (b) the positive electrode, (c) the membrane, and (d) the negative electrode.

17. The cell according to claim 14 wherein the casing is a metallic casing.

18. The cell according to claim 14 wherein the casing comprises a plastic part and a metallic part.

* * * * *